United States Patent [19]
Saito et al.

[11] Patent Number: 5,347,375
[45] Date of Patent: Sep. 13, 1994

[54] COMPUTER-ASSISTED HOLOGRAPHIC IMAGE FORMATION TECHNIQUE WHICH DETERMINES INTERFERENCE PATTERN DATA USED TO FORM THE HOLOGRAPHIC

[75] Inventors: Tutomu Saito, Yokohama; Toshikazu Matsui, Kobe, both of Japan

[73] Assignee: Kabushiki Kaisha Toshiba, Kawasaki, Japan

[21] Appl. No.: 981,296

[22] Filed: Nov. 25, 1992

[30] Foreign Application Priority Data

Nov. 26, 1991 [JP] Japan .................................. 3-336137
Nov. 26, 1991 [JP] Japan .................................. 3-336138

[51] Int. Cl.$^5$ .......................... G03H 1/08; G03H 1/04; G06F 7/38; G06K 9/76
[52] U.S. Cl. ......................................... 359/9; 359/35; 359/900; 364/723; 382/31
[58] Field of Search ......................... 359/9, 3, 35, 900; 364/723; 395/116, 119, 120, 121, 126, 127, 129; 382/31, 43; 348/40, 41

[56] References Cited

U.S. PATENT DOCUMENTS

| | | | |
|---|---|---|---|
| 3,606,518 | 9/1971 | Metherell | 359/9 |
| 4,109,996 | 8/1978 | Ersoy | 359/900 |
| 4,701,006 | 10/1987 | Perlmutter | 359/900 |
| 4,778,262 | 10/1988 | Haines | 359/9 |
| 4,969,700 | 11/1990 | Haines | 359/9 |
| 5,119,214 | 6/1992 | Nishii et al. | 359/9 |
| 5,194,971 | 3/1993 | Haines | 359/9 |

OTHER PUBLICATIONS

SPIE Institute Series, vol. 158, 1990, pp. 247–267, S. A. Benton, "Experiments in Holographic Video Imaging".

Primary Examiner—Loha Ben
Assistant Examiner—John Juba, Jr.
Attorney, Agent, or Firm—Oblon, Spivak, McClelland, Maier & Neustadt

[57] ABSTRACT

A computer-generated hologram recording apparatus includes a diffraction image generator which receives an input image signal representing an object and computes a corresponding diffraction pattern with a first sampling density. An interpolation processor is connected to the diffraction image generator via an intermediate page memory. The interpolation processor subjects the diffraction pattern to the interpolation process to create an interpolated diffraction pattern with an increased second sampling density. An interference pattern generator is connected to the interpolation processor to compute an interference caused pattern between the interpolated diffraction pattern and a reference wave by converting amplitude and phase distributions of the input image signal into the intensity distribution. A multi-beam scan printing apparatus records the interference pattern on a previously selected recording medium for later reproduction by use of white light.

32 Claims, 11 Drawing Sheets

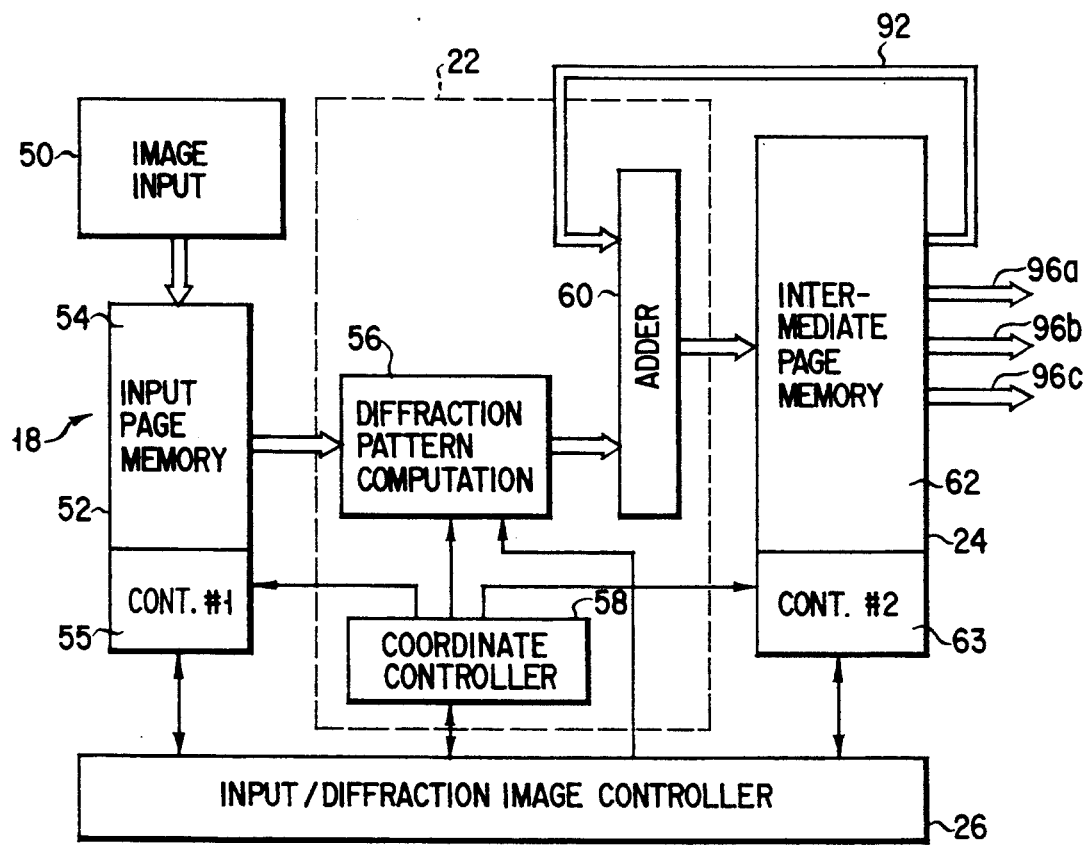
F I G. 2
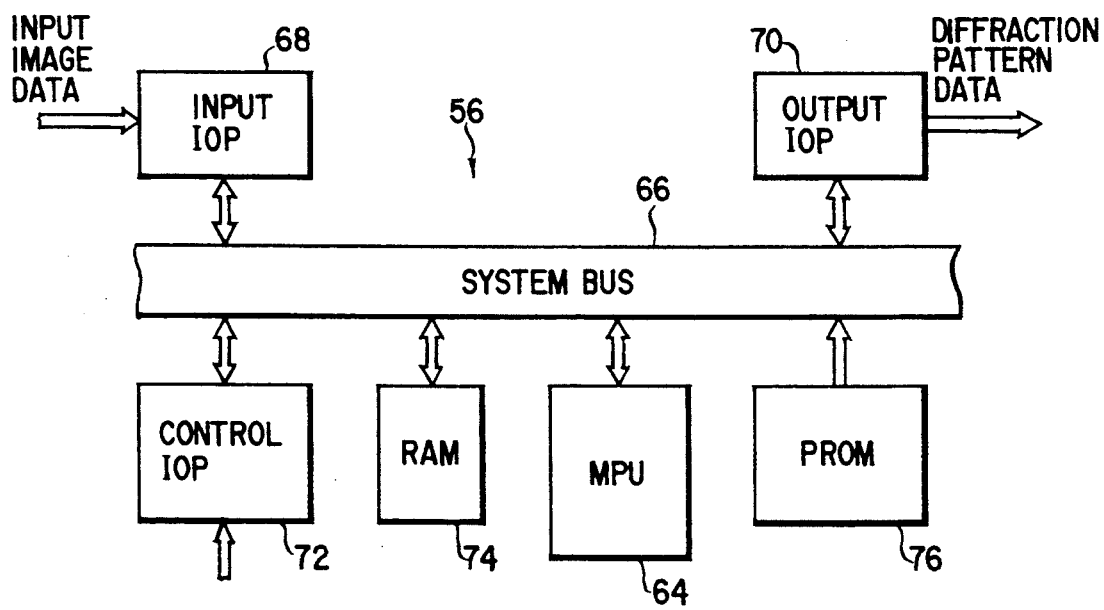
F I G. 3

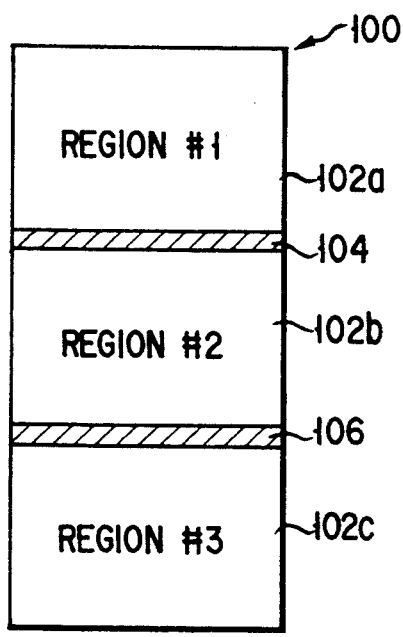
F I G. 5
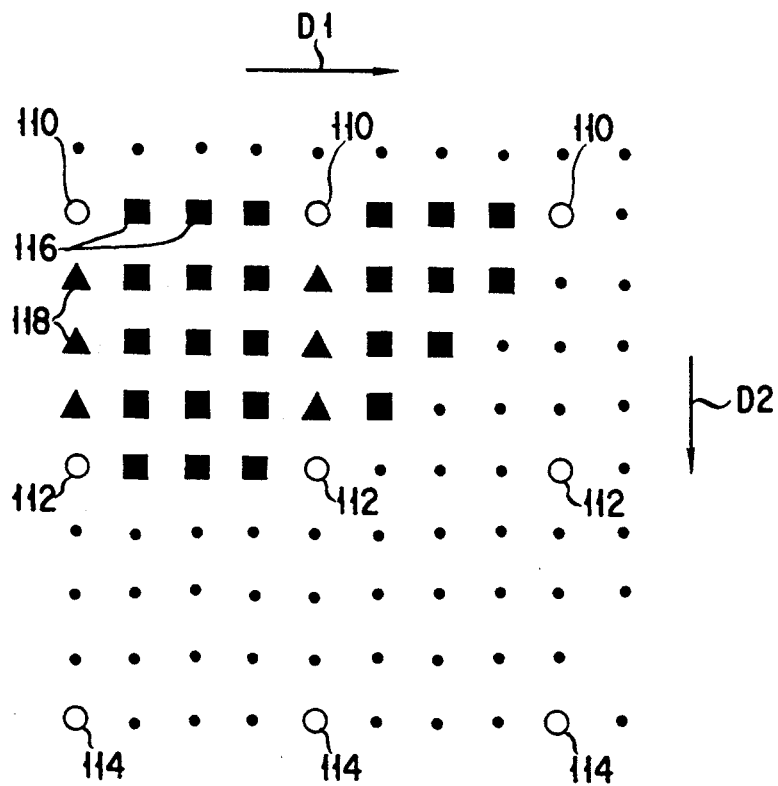
F I G. 6

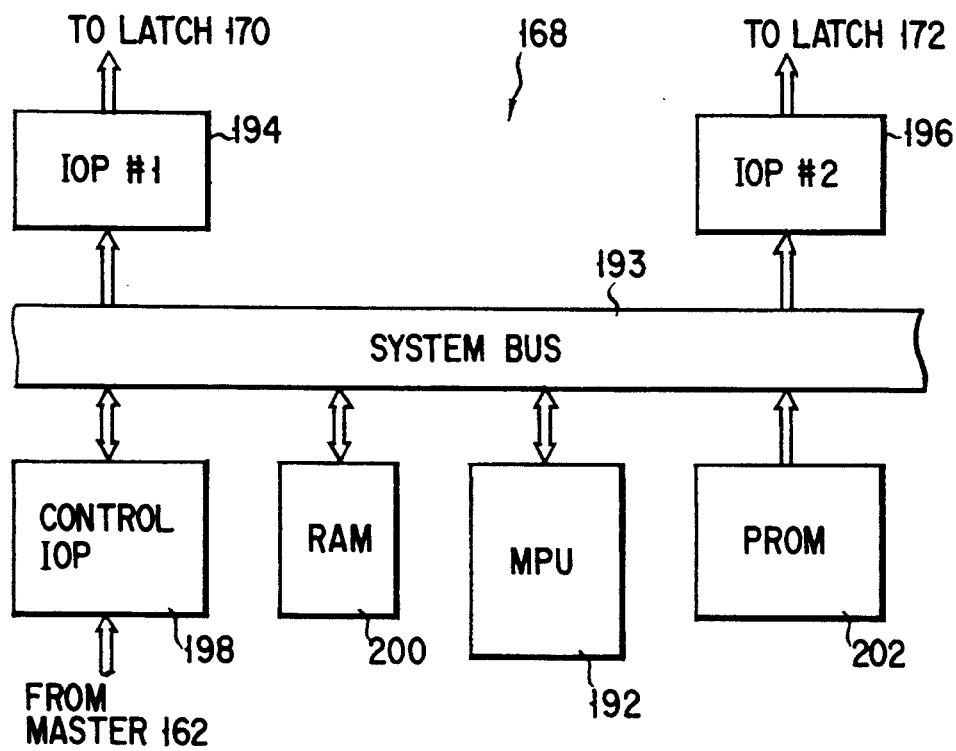
F I G. 9
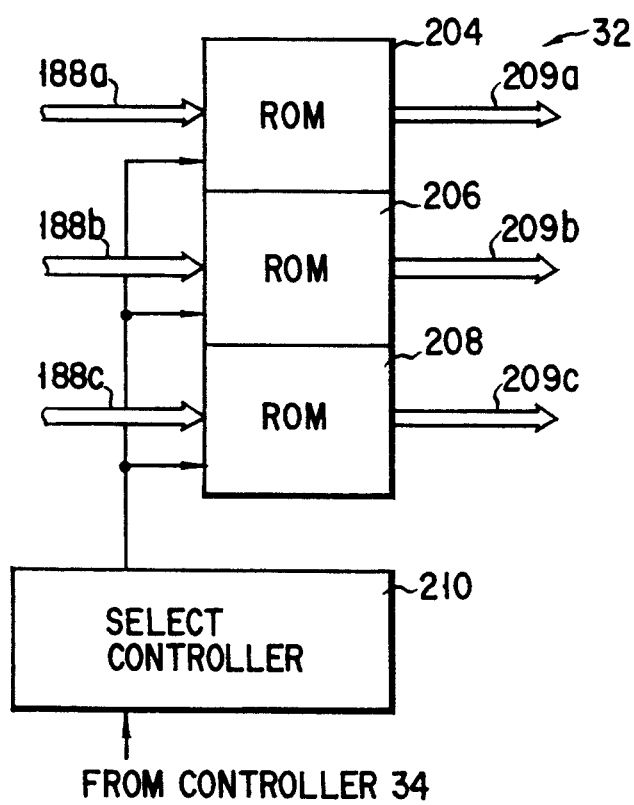
F I G. 10

COMPUTER-ASSISTED HOLOGRAPHIC IMAGE FORMATION TECHNIQUE WHICH DETERMINES INTERFERENCE PATTERN DATA USED TO FORM THE HOLOGRAPHIC

BACKGROUND OF THE INVENTION

1. Field of the Invention

The present invention relates generally to holographic imaging techniques and, more particularly, to an apparatus for forming holographic images corresponding to input object image information for later reproduction or reconstruction of three-dimensional (3-D) optical images. This invention also relates to a computer-assisted hologram recording system for computing a wave disturbance (diffraction image pattern) obtained on the hologram recording surface based on a sampled data of a 3-D object of interest and for recording or printing on a recording medium the pattern of interference between the resultant diffraction pattern and reference light.

2. Description of the Related Art

Computer holography is generally known as a technique for forming a hologram by computing and recording the holographic image pattern of a 3-D object on a recording medium, such as a planar holographic plate or sheet, under the assistance of digital computer equipment. With the recent development of digital equipment, the computer hologram recording technique is becoming important more and more in the application field of 3-D image information processing, 3-D object measurement, 3-D display and so forth. Particularly, the technique of forming and reproducing holograms viewable in white light is important as stereoscopic image memory devices in the art of computer image processing.

Unlike the existing purely optical hologram devices, the computer-hologram apparatus produces by computation a holographic image pattern to record a resultant computer-generated holographic image on a recording medium of selected type. Since the computer can create any desired 3-D object images including imaginary graphic images, the computer hologram is excellent in flexibility and wide in applicability for industrial use. The presently available computer hologram apparatus, however, suffers from the fact that the efficiency of computation remains low. An increased amount of repetitive computations should be required to produce a computer hologram. The necessity of such repetitive computations forces the total processing time to increase, which necessitates the use of a large-scale computer system. This reduces the production efficiency of 3-D object hologram which is required to be recorded to maintain the high quality of a reproduced image.

Until today, several techniques have been proposed for reducing in amount the image information to be processed, thereby to attain an increased computation efficiency in the art of computer holography. One of the techniques may be found in what is called the "Lohmann type" computer hologram apparatus as is well known among those skilled in the art. This computer hologram apparatus generates a hologram by computing the diffraction pattern of an object. The computation algorithm is described, for example, in "Precision Machine", Vol. 47, No. 12, Supplement, (Dec. 6, 1981) at pp. 101–105, wherein a computer-generated hologram is formed by (1) inputting an object information to the computer, (2) deriving the wave of an object on the hologram plane by computation of the diffraction image to produce a binary-coded recording pattern, (3) creating an original picture drawing, and (4) reducing the original picture by photographing (completion of the hologram).

To reduce the amount of information to be computed, a hologram is created by dividing the hologram plane into a large number of small picture points (called "cells"), computing a diffraction pattern at the representative point of each cell to derive the complex amplitude and phase of each point, and giving an opening to each cell according to the computation results. The opening given to each cell is determined as follows: the height of opening is determined in accordance with the computed value of the complex amplitude of a corresponding cell, whereas the positional relation (distance) between the center of the opening and the cell center is determined in accordance with the value of the phase. The method of determining the size and position of the opening for each cell is described in detail in A. W. Lohmann & D. P. Paris "Binary Fraunhofer Holograms generated by Computer" Appl. Oct., Vol. 6, No. 10 (October 1967) at pp. 1739–1748. An original object image can be optically reconstructed or reproduced by applying a coherent reproducing light such as laser light to the recorded hologram. A resultant reproduced image obtained from the computer hologram, however, is not satisfactory in the image quality. This is because the center of the cell opening is positionally deviated from the representative point used as the basis for computations of phase.

Another method of creating a computer hologram is also known which is based on the computation of a fringe-shaped interference pattern. The interference computation type computer-generated holography is conceptually similar to a conventional optical hologram forming scheme in that a reference light emitted from a laser source is superposed on the diffraction image of an object of interest to derive an interference pattern therebetween. The recording of a hologram is performed so that the transmissivity or the density may vary on a photographic plate in accordance with the intensity of a resulting fringe-like interference pattern.

According to the interference computation type computer-generated holography, unlike the aforementioned diffraction computation type (i.e., Lohmann type) computer-generated holography, the phase information of a holographic image is recorded in the interference fringe form. The phase error can thus be minimized, which leads to enhancement of the image quality. However, the interference computation type holography suffers from the decreased computation efficiency due to the fact that the decisive means for reducing the amount of information used to compute the interference pattern has not been accomplished yet. Extra large-capacity semiconductor memories are necessary to execute the computation for an enormous amount of information. This results in that the scale of the hologram recording system is increased unwantedly, which makes almost impossible the accomplishment of a high-speed computation process with the use of a smaller computer system. This is a serious bar to the industrial spread of the computer hologram recording system.

SUMMARY OF THE INVENTION

It is therefore an object of the present invention to provide a new and improved computer hologram recording technique.

It is another object of the invention to provide a new and improved computer hologram recording apparatus capable of enhancing the computation efficiency while maintaining high quality of a reproduced image.

It is a further object of the invention to provide a new and improved computer hologram recording apparatus capable of enhancing the computation efficiency to attain a high-speed process while maintaining the high quality of an image reproduced by use of white light.

In accordance with the above objects, the present invention is drawn to a specific computer-assisted hologram recording apparatus which comprises a first computation section for receiving an input image signal representing an object and computing a corresponding diffraction pattern with a first sampling density. A second computation section is connected to the first computation section to subject the diffraction pattern to the interpolation process so as to create an interpolated diffraction pattern with a second sampling density which is thus increased. A third computation section is connected to the second computation section to compute an interference pattern between the interpolated diffraction pattern and the reference wave. An output section, such as a printer or a display device, is connected to the third computation section to either record the interference pattern on a previously selected recording medium, or cause the interference pattern to be displayed on the display screen of the display device.

The foregoing and other objects, features, and advantages of the invention will become apparent from the following more particular description of preferred embodiments of the invention, as illustrated in the accompanying drawings.

BRIEF DESCRIPTION OF THE DRAWINGS

FIG. 2 is a diagram showing the internal construction of a diffraction-image computation section contained in the hologram recording apparatus of FIG. 1;

FIG. 3 is a diagram showing the internal construction of a main computation unit contained in the diffraction image computation section of FIG. 2;

FIG. 5 is an illustration modeling a method of performing the internal division for a memory space of the intermediate page memory of FIG. 4;

FIG. 6 is an illustration partially indicating the diffraction pattern which is interpolated in the main scanning direction X and the sub-scanning direction Y;

FIG. 9 is a block diagram showing the internal circuit construction of a reference light wave generator of FIG. 8;

FIG. 10 is a block diagram showing the internal circuit configuration of a gradient corrector of FIG. 1;

DETAILED DESCRIPTION OF THE PREFERRED EMBODIMENTS

Figure 1:
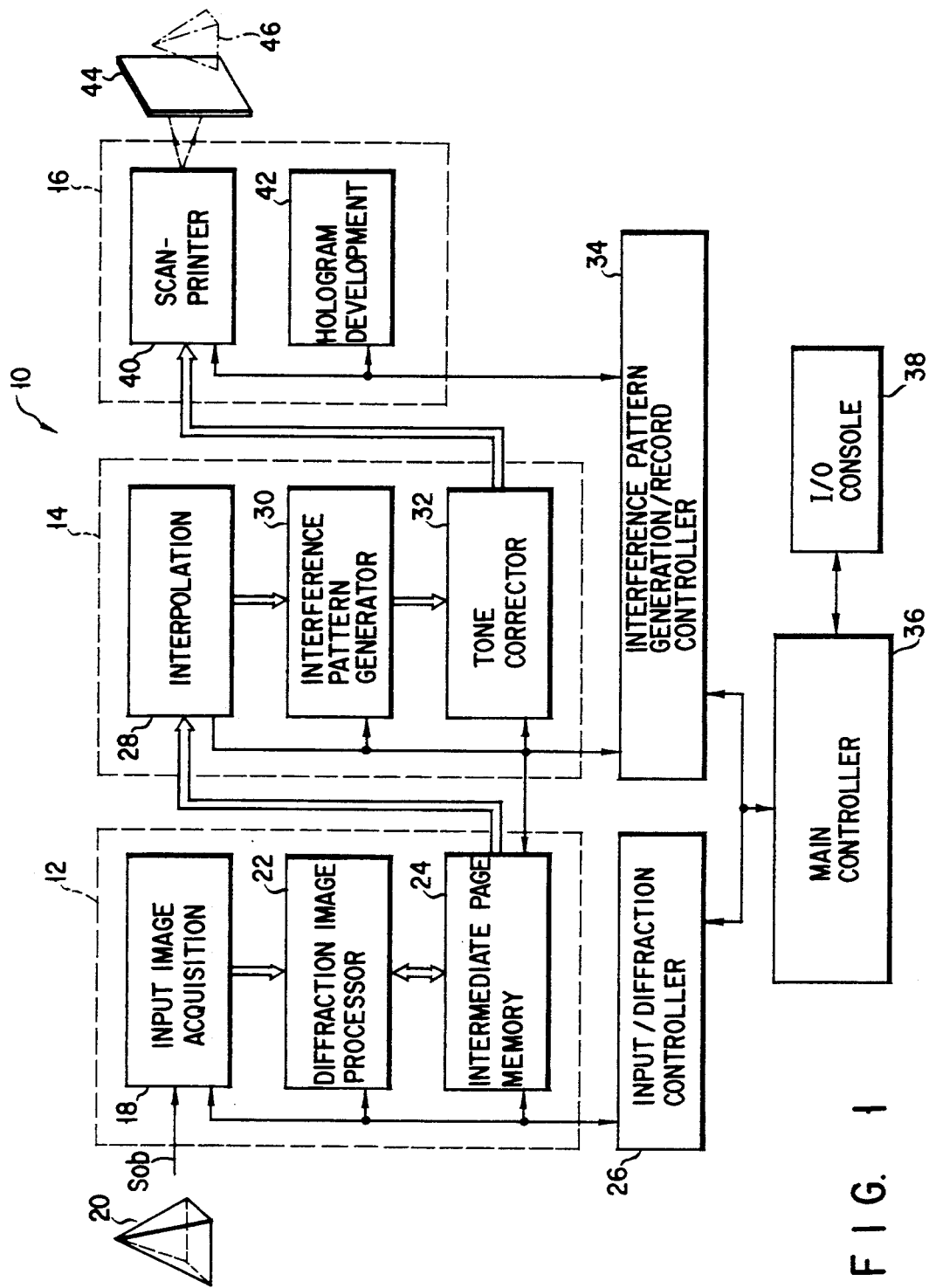
FIG. 1 is a block diagram schematically showing the whole construction of a computer hologram recording apparatus in accordance with one preferred embodiment of this invention.

Referring now to FIG. 1, a computer hologram recording apparatus in accordance with one preferred embodiment of this invention is generally designated by the numeral 10. The hologram recording apparatus 10 includes a diffraction image computation section 12, an interference image computation section 14 and an image recording section 16. The diffraction image computation section 12 has a function of computing a diffraction image (diffraction pattern) information data based on a sampled input image data representing an object of interest (20) in the hologram forming process. The interference image computation section 14 and image recording section 16 compute interference image information data indicative of an interference pattern between the resultant diffraction pattern data and a reference light data, and record the same on a preselected hologram recording medium.

The diffraction image computation section 12 includes an input image acquisition section 18 for receiving a sampling image data being externally supplied thereto. The input image acquisition section 18 receives a sampling object signal Sob, which is produced by the photoelectric conversion to represent an object of interest 20 by means of an external photoelectric converting image photographing unit (not shown). Alternatively, the input image acquisition section 18 may be connected to an external computer graphics creation equipment (not shown); in such a case, the equipment internally produces a graphic image signal Sob that represents the object 20 without requiring any optical photographing process of the object 20. In either case, the input image acquisition section 18 contains a semiconductor page memory for temporarily storing the input image signal Sob therein. The page memory will be designated by the numeral 52 in FIG. 2.

The diffraction image computation section 12 also includes a diffraction image processing section 22 for computing a diffraction image or pattern and an intermediate page memory 24 which is bi-directionally communicative with the diffraction image processor 22. The intermediate memory 24 temporarily stores therein a computed diffraction pattern information that is output by the diffraction image processor 22 therein. The above constituents 18, 22 and 24 are connected to an input/diffraction image control section 26.

As shown in FIG. 1, the interference image computation section 14 includes (1) an interpolation processing section 28 coupled to an output of the intermediate page memory 24, (2) a processing section 30 connected to the interpolation processor 28 to produce an interference image or pattern, and (3) a gradient correcting section 32 connected to the interference image generator 30. The constituents 28, 30, 32 are connected to an interference image/recording control section 34 and operate under the control of the controller 34. The intermediate memory 24 of the diffraction image computation section 12 is also connected to the controller 34. The controllers 26, 34 are associated with a main controller 36. An input/output console section 38 is connected to the main controller 36. The I/O console 38 includes a known keyboard unit and display terminal such as cathode-ray tube (CRT) display terminal or a thin-type display device, as a man-machine interface.

As shown in FIG. 1, the image recording section 16 includes a scan recording section 40 and a hologram developing section 42 and may be a multi-beam scanning recorder device which records or prints a finally obtained interface pattern on the recording surface of a recording medium 44 such as a photographic plate or sheet. The plate 44 is subjected to the developing treatment by the developer 42 to complete the printing of a hologram. The holographic plate 44 reproduces a 3-D object image 46 upon illumination of a reproducing reference light (not shown).

As shown in FIG. 2, the input image acquisition section 18 includes an image data input unit 50 and a page memory unit 52 connected to the output of it. The page memory 52 includes a memory area 54 and a memory controller 55 associated therewith. The diffraction image processor 22 includes a diffraction pattern computation unit 56, coordinate control unit 58 and adder 60. The computation unit 56 computes a two-dimensional (2-D) diffraction pattern which is obtained on the hologram recording surface with respect to each cell of the sampling input image data stored in the page memory 52. The diffraction pattern thus computed is sequentially supplied to a first input of the adder 60 under the control of the coordinate controller 58. The adder 60 has an output connected to a memory area 62 of the intermediate page memory 24. The page memory area 62 is provided in the intermediate page memory 24 together with a memory controller 63. The intermediate page memory area 62 has a plurality of outputs (for example, four outputs), one of which is fed back to a second input of the adder 60.

The diffraction pattern computation unit 56 fetches data of one input cell read out from the input page memory 52 and computes the two-dimensional (2-D) diffraction pattern thereof. The result of that computation is supplied to the first input of the adder 60. At this time, the second input of the adder 60 is supplied with data read out from the intermediate page memory 24. Data items supplied to the first and second inputs of the adder 60 are added together and the updated result of computation appears on the output of the adder 60. The updated result of computation is written into the intermediate page memory 24 again. Thus, diffraction patterns derived by the adder 60 for respective picture elements (PEL) or cells of the input image are added together to create a diffraction pattern which is obtained as the result of addition at every picture element and which is kept stored in the intermediate page memory 24 for later use.

Each picture element (cell) of diffraction image data essentially consists of two multivalued gradient data segments which are the real part and imaginary part of a complex number. The operations of writing the diffraction pattern data into the intermediate page memory 24 and of reading the data from the memory 24 are carried out sequentially and alternately. The 2-D coordinate position control in the image space for a series of memory access operations is effected in accordance with coordinate data generated by the coordinate controller 58. A cell position whereat the input image is read and a cell position of the diffraction pattern are determined under the control of the controller 58; then, the positional superposition of each of the diffraction patterns in the intermediate page memory 52 is effected. As a result, final diffraction pattern data is written into the memory area 62 of the intermediate page memory 24.

The computation algorithm for deriving diffraction patterns of the hologram may be determined differently depending on the type of the hologram to be formed. For example, in a Fresnel's hologram used when the distance between an object and the hologram plane is relatively short, the approximate computation for a Fresnel diffraction image can be made by use of Fresnel integrals. Alternatively, in a Fourier transform hologram used when the distance between the object and the hologram plane is relatively long, the approximate computation of Fraunhofer diffraction image can be applied by use of the Fourier transform. To flexibly cope with such different types of holograms, the diffraction pattern computation unit 56 of this embodiment is constructed by use of a micro-processing unit (MPU) 64 as shown in FIG. 3.

More specifically, the MPU 64 is connected to an internal system bus 66 of the diffraction pattern computation unit 56 together with an input-stage data input-/output port (IOP) 68, an output-stage data IOP 70, a control-signal IOP 72, a random access memory (RAM) 74 and a programmable read-only memory (PROM) 76. The input IOP 68 receives an input image data and supplies the same to the system bus 66. The output IOP 70 receives the result of computation by the diffraction pattern computation unit 56 appearing on the system bus 66 and sends forth the same to the adder 60 of FIG. 2. The control IOP 72 is used to receive various kinds of control information signals that are supplied from a host control machine such as a host computer (not shown). The PROM 76 stores therein one or a plurality of computation algorithm software programs externally supplied via the system bus 66. In the case of the plurality of different kinds of algorithm software programs being stored in the ROM 76, one of the algorithms which is optimum for the type of a presently selected hologram can be made active in reply to an instruction from the control IOP 72. Further, various parameters of hologram models including the positional relation between the hologram and the object, wavelength and the like can be externally set in the control IOP 72. The MPU 64 performs processing operations according to the current parameter setting state in the control IOP 72.

By way of an example, assume that the Fresnel's hologram of a two-dimensional (2-D) object image is computed. The following algorithm is used to derive Fresnel diffraction image data. Firstly, the 2-D image is sampled and a set of sampled values is derived. The sampling density at this time may be determined depending on the performance of a system hardware actually used and/or the required quality of an image reproduced from the hologram; in practice, the sampling density may be so selected as to offer the resolution of approximately eight to ten dots per one millimeter. In the above sampling process, the operation of enlarging or reducing the 2-D image may be additionally effected; in this case, the hologram recording apparatus 10 is so designed to have the hologram enlarging/reducing function.

A 2-D Fresnel diffraction pattern is then computed which is formed on the hologram plane by a light component emitted from one of a large number of resultant sampling points is computed. A similar diffraction pattern computation is repeatedly executed with respect to each of the remaining sampling points. The diffraction pattern computation may be made under an assumption that the wavefront of light emitted from a point light source is computed. The diffraction pattern computation may alternatively be made under an assumption that a small opening is formed in each of the sampling points and the wavefront of light is computed which light is transmitted through the small opening when a plane wave of an intensity corresponding to the sampling value of the sampling point is applied to the opening from the rear side thereof. In either of the above cases, Fresnel integrals are used for the computation of diffraction image pattern as is well known to the experts in the art of the computer hologram. A Fresnel diffraction image pattern obtained from each sampling point is added to those of the remaining sampling points to finally derive Fresnel diffraction pattern information of the 2-D object.

The Fresnel diffraction pattern computation for a 3-D object may be attained by expanding the above-described 2-D object processing technique in such a manner that (1) the technique is modified to assign a sampling value to each point of a 3-D grating so as to represent sampling values in a 3-D space or (2) the technique is modified to represent surfaces of a 3-D object by use of a set of sampling points having respective sampling values and add together Fresnel diffraction patterns derived from the sampling points. If desired, removal of hidden surfaces (hidden-surface removal) may be performed.

The diffraction pattern computation with the lower sampling density as described above is effected automatically according to the algorithm software program being currently selected in the PROM 76 by the MPU 64 of FIG. 3. The computed diffraction pattern data is supplied to the intermediate page memory 24 of FIG. 2 and stored in the memory area 62 thereof. The internal construction of the intermediate page memory 24 is shown in detail in FIG. 4.

Figure 4:
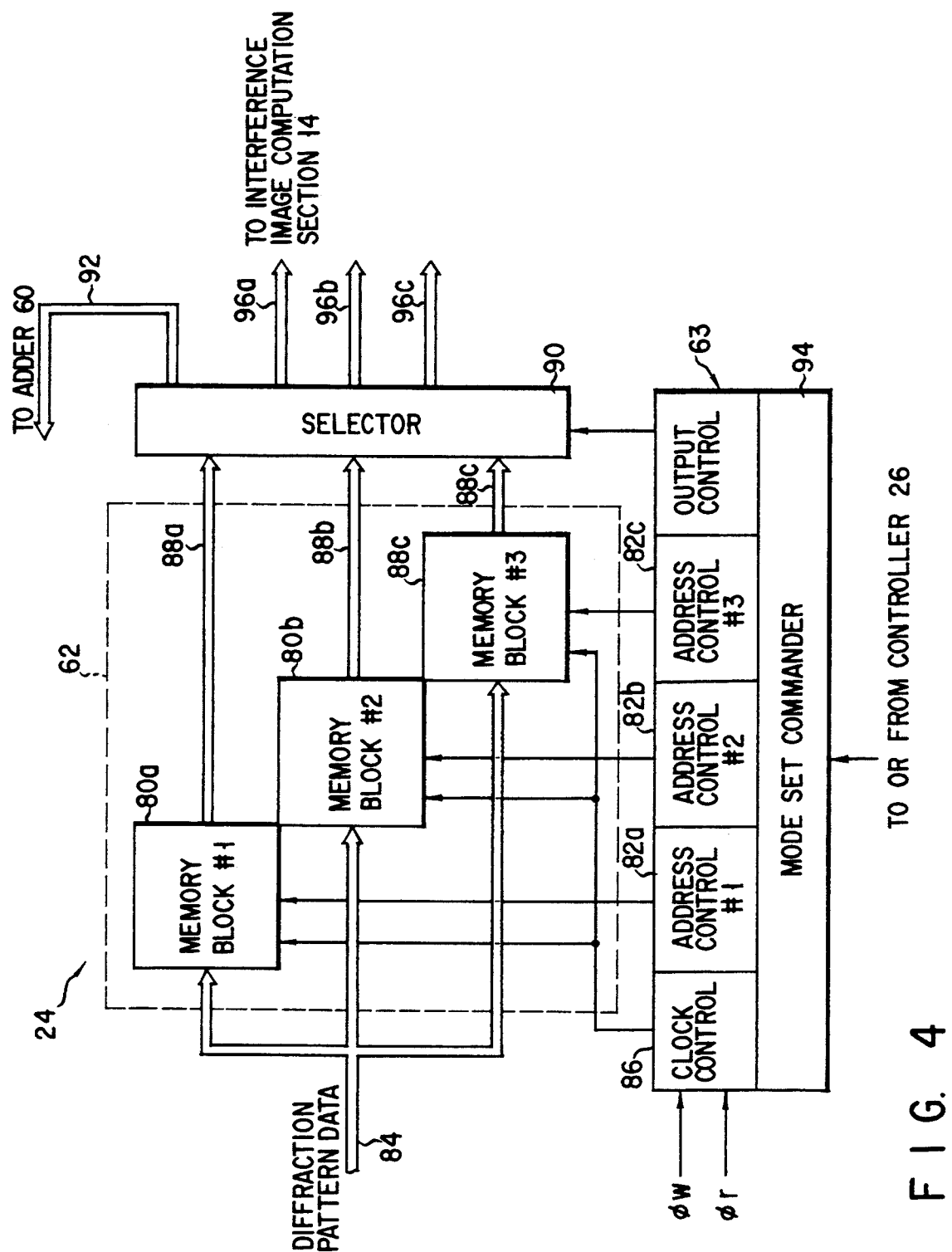
FIG. 4 is a diagram showing the internal construction of an intermediate page memory unit contained in the diffraction image computation section of FIG. 2.

As shown in FIG. 4, the memory area 62 of the intermediate page memory 24 is divided into a plurality of memory blocks, for example, three memory blocks 80a, 80b, 80c. The memory blocks 80 are associated with exclusive address controllers 82a, 82b, 82c, respectively. The number of memory blocks 80 is determined according to the number of pipe lines used in the interference fringe computation and hologram recording process effected by the interference image computation section 14 of FIG. 1. In this embodiment, the number is set to correspond to the number of divisions of the recording beam of the multi-beam scanning printer 40.

The three memory blocks 80a, 80b, 80c are connected to the diffraction image processor 22 via a branched data bus 84. The memory blocks 80 are connected to a common clock control unit 86. The control unit 86 is supplied with a write clock signal $\phi w$ and a read clock signal $\phi r$. The data blocks 80 are respectively connected to three inputs of a selector 90, which performs the data selecting operation under the control of an output control unit 63 via data buses 88a, 88b, 88c. The selector 90 has four outputs, one of which is connected to the adder 60 of FIG. 2 through a feedback data bus 92. The remaining three outputs of the selector 90 are connected to the interference image computation section 14 of FIG. 1 by way of respective data buses 96a, 96b, 96c.

The intermediate page memory 24 has two different operation modes. The first operation mode is a "read modify write" mode in which diffraction pattern addition data is read out and diffraction pattern data is written into the same memory address. In this mode, the whole memory space of the three memory blocks 80 is regarded as a sheet of page memory and the entire memory address control is effected by the address memory control units 82. The second operation mode is a "separate read/write" mode, wherein the three memory banks 80 are independently accessed by the respective address control units 82 and diffraction pattern data items stored therein are separately read out and supplied to the selector 90. Selective specification of one of the above two modes or switching between the two modes is controlled by a mode setting commander 94 associated with the units 63, 82 and 86. The selector 90 sends forth diffraction image data items collectively or separately read out from the memory banks 80a, 80b, 80c via data buses 96a, 96b, 96c which are connected to the three outputs thereof.

The internal division of the memory space of the intermediate page memory 24 is shown in a model form in FIG. 5, wherein the two-dimensional pattern of one sheet of diffraction pattern computed by the diffraction pattern processor 22 is designated by the numeral 100. The pattern 100 is subdivided into three areas 102a, 102b, 102c which slightly overlap each other at their end portions. Write operations of data into the three areas 102a, 102b, 102c are respectively effected by use of the three memory blocks 80a, 80b, 80c shown in FIG. 4. An overlapping portion 104 between the first and second areas 102a, 102b is hatched for illustration purposes only. This is also applied to an overlapping portion 106 between the second and third areas 102b, 102c. Each of the overlapping portions 104, 106 corresponds to the width of one line of a diffraction pattern data having the sampling density. The double control for diffraction pattern data in each overlapping portion assures that image data is prevented from being accidentally removed in the interpolation process described later.

The interpolation processor 28 of FIG. 1 performs a specific interpolation process which matches the coarse sampling density of diffraction pattern data stored in the intermediate page memory 24 with the precise sampling density of interference pattern data of a holographic image finally recorded on the photographic plate 44. In principle, the interpolation process is equivalent to the line density converting process to be effected in the ordinary image processing field. This embodiment uses a 2-D interpolation process for electronically effecting the line interpolation in the main scanning direction X of the diffraction image pattern and the sub-scanning direction Y transverse to the main scanning direction.

In FIG. 6, a diffraction pattern is partly illustrated. For purposes of explanation, nine white circles of three rows and three columns are used to represent sampling points of the diffraction image pattern. The first row of three sampling points 110 aligned in the main scanning direction X corresponds to an i-th line of the diffraction pattern. The remaining two rows of sampling points 112, 114 respectively correspond to (i+1)th and (i+2)th lines of the diffraction pattern.

Assume that a three-point interpolation scheme is adopted for a space between adjacent ones of the sampling points 110, 112, 114. Three interpolation points 116 indicated by black squares and arranged along a first direction D1 (one of the main scanning direction X and the sub-scanning direction Y) between adjacent ones of the sampling points 110 of the i-th line are first computed by use of the density information of the sampling points 110 and added at a constant interval. The density values of the points 110, 116 are computed, and interference fringe data of one line is then computed based on diffraction image data of one-line density value by means of the interference pattern generator 30 of FIG. 1. After a corresponding scanning record operation is effected or while the operation is being effected, the same three-point interpolation process is effected for the following (i+1)th line of sampling points 112 in the first direction D1. Then, the secondary interpolation process is effected along a second direction D2 transverse to the first direction D1 (the other of the main and sub-scanning directions X and Y) between the i-th and (i+1)th lines, and as a result, interpolation points indicated by black triangular marks 118 in FIG. 6 are added between the sampling points 110 and 112. At this time, interpolation points which are indicated by the same black square marks as the interpolation points 116 and which correspond in number to the interpolation points 116 in the first direction D1 are added between the interpolation points 116 in the direction D1. The interpolation process in the above two directions D1, D2 is repeatedly effected for the remaining lines of the diffraction image pattern in the same manner as described above, and as a result, a two-dimensionally interpolated diffraction pattern with a sampling density which is increased in both of the both directions D1, D2 is attained. In FIG. 6, repetition of square marks is omitted for purposes of illustration.

Figure 7:
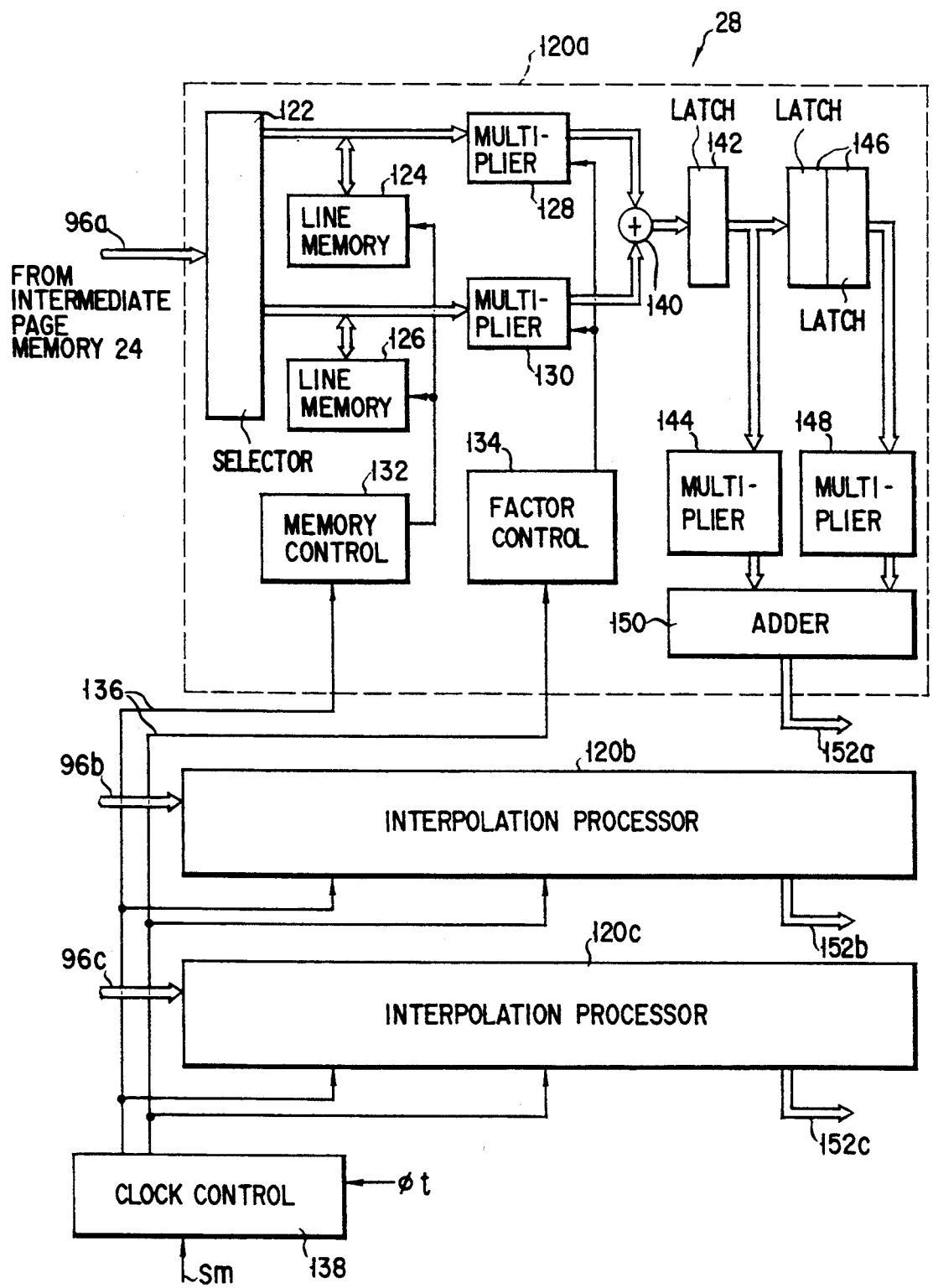
FIG. 7 is a block diagram showing the internal construction of an interpolation processor of FIG. 1.

In order to enhance the performance of the interpolation process in the two directions, it is recommendable to construct the interpolation processor 28 as shown in FIG. 7. The interpolation processor 29 essentially consists of three parallel interpolation processing units 120a, 120b, 120c which are respectively connected to output data buses 96a, 96b, 96c of the intermediate page memory 24. The number (channel number) of the interpolation processing units 120a, 120b, 120c used is determined according to the number of pipe lines at the succeeding stage. The three-channel interpolation processing units 120a, 120b, 120c are similar in circuit configuration to one another; the internal construction of only the unit 120a is shown in FIG. 7 to avoid redundancy in the drawing.

As shown in FIG. 7, the interpolation processing unit 120a includes a selector 122 connected to the data bus 96a. The selector 122 has two outputs, which are respectively connected to two line memories 124, 126 and two coefficient multipliers 128, 130. The line memories 124, 126 are controlled by a control unit 132. The coefficient multipliers 128, 130 are controlled by a control unit 134. The controllers 132, 134 are connected to a clock control unit 138, to which a clock signal $\phi t$ and an interpolation command signal Sm are supplied via clock signal supplying lines 136.

The two coefficient multipliers 128, 130 have outputs connected to first and second inputs of an adder 140. An output of the adder 140 is connected to another coefficient multiplier 144 via a latch circuit 142. An output of the latch circuit 142 is connected to still another coefficient multiplier 148 which is coupled to an adder circuit 150 together with the multiplier 144 via two series-connected latch circuits 146. The adder 150 has an output coupled to a data bus 152a, through which resultant interpolated pattern data is sent forth toward the interference pattern generator 30 shown in FIG. 1. Each of the coefficient multipliers 128, 130, 144, 148 may be constructed by a ROM for storing previously selected coefficients and a circuit for multiplying the coefficient by an input signal.

Diffraction image data is sequentially input to the selector 122 of FIG. 7 for each line data component in the main scanning direction. The selector 122 alternately supplies input data components to the two line memories 124, 126. The line data components are written into the memories 124, 126 under the control of the controller 132. The controller 132 is supplied with a clock signal corresponding to the distribution of pixels by means of a clock controller 138. Data items written into the line memories 124, 126 are read out from the line memories for each pixel and respectively transferred as image signals to the coefficient multipliers 128, 130 which in turn multiply the data items by a preset coefficient. The image signals multiplied by the preset coefficient are weighted image signals which are added together by the adder 140, thus effecting the line density conversion in the sub-scanning direction.

The output of the adder 140 is transferred to the coefficient multiplier 144 via the latch circuit 142 and also supplied to the other coefficient multiplier 148 via the latch circuit and the two-stage latch circuit 146. The coefficient multipliers 144, 148 perform the weighting process for the line density conversion in the main scanning direction. Addition of the two-stage latch 146 provides a signal delay necessary for synchronizing the timings of inputs of the alternately transferred real and imaginary parts of the complex number of the diffraction image data to the multipliers 144, 148 in order to stably attain the mutual comparison between the real and imaginary parts. The weighted image signals created by the multipliers 144, 148 are added together by an adder 150 so as to achieve the line density conversion process in the respective scanning directions. Note that coefficient data items stored in internal ROMs (not shown) with known construction of the multipliers 128, 130, 144, 148 are repetitively read out in synchronism with a clock signal from the clock controller 138. The magnitude in the weighting process may be changed by changing the values of coefficient data items; therefore, various interpolation processes other than the linear interpolation can be applied.

The diffraction image pattern data items subjected to the interpolation process to have a sampling density increased as described above are supplied to the fringe-form interference pattern generator 30 of FIG. 1 via output data buses 152a, 152b, 152c. The fringe-form interference pattern generator 30 computes a fringe-form interference pattern created by superposition of an interpolated diffraction image pattern and the reference light according to a previously given computer algorithm and creates an electrical information signal for numerically emulating the optical fringe-form interference pattern.

Figure 8:
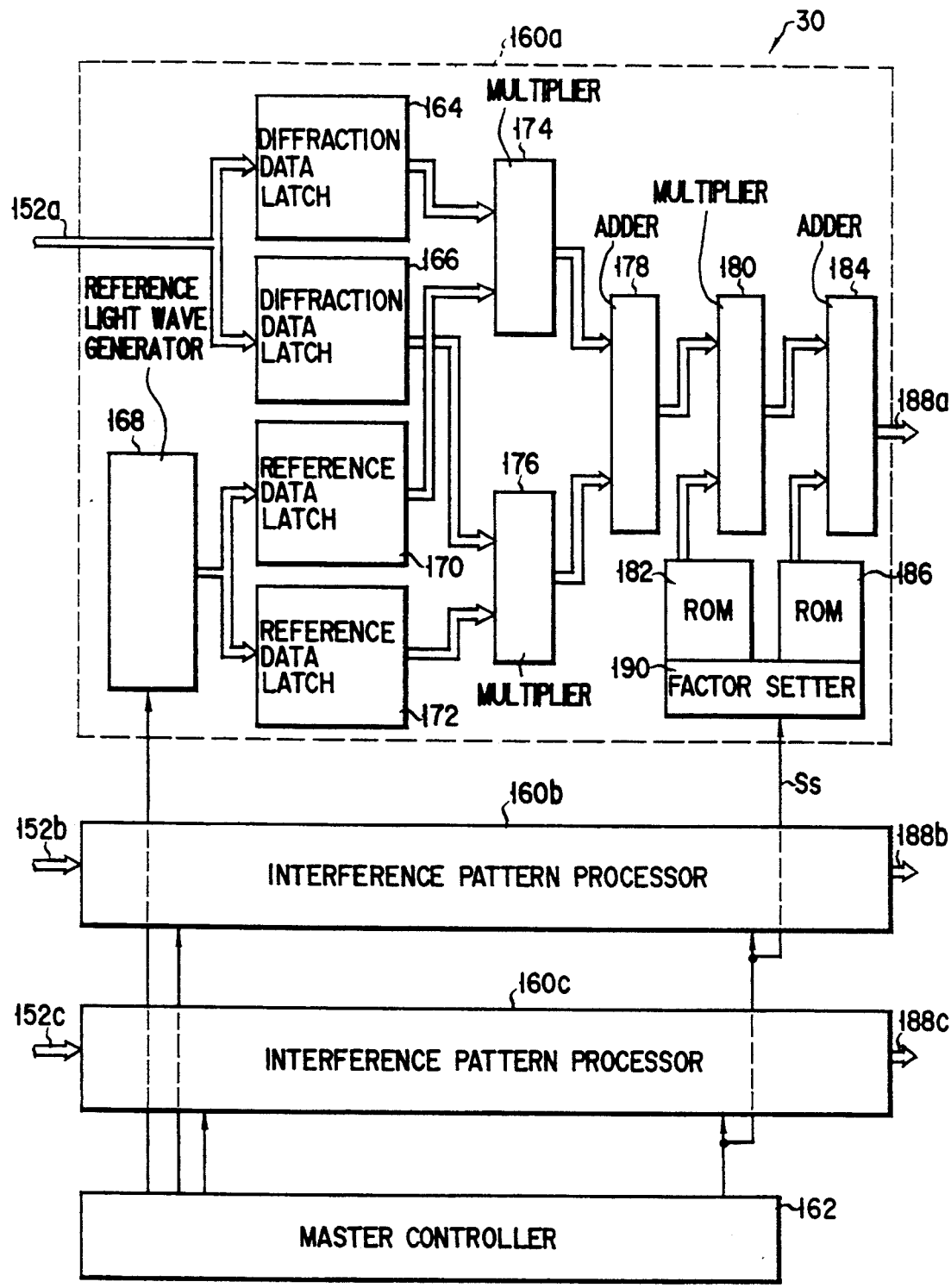
FIG. 8 is a block diagram showing the internal construction of an interference fringe pattern generator of FIG. 1.

As shown in FIG. 8, the fringe-form interference pattern generator 30 essentially consists of three parallel interference pattern processing units 160a, 160b, 160c which are respectively connected to the data buses 152a, 152b, 152c. The three-channel interference pattern processors 160 are connected to a master controller 162 which effects the supervisory services/control operation relating to the interference image computation containing the parameter setting control and coordinate management control with respect to the processors 160. The interface pattern processors 160 have the same circuit construction, and therefore, the internal construction of only one (160a) of them is shown in FIG. 8.

As shown in FIG. 8, the interface pattern processor 160a includes two data latch sections 164, 166 which are connected to the data bus 152a and which respectively latch data components of the real and imaginary parts of input diffraction image data therein. The interference pattern processor 160a includes a reference light wave generating circuit 168 which supplies a wavefront information signal mathematically representing the wavefront of the coherent reference light (which may be a plane wave or spherical wave) to two data latch sections 170, 172. The data latch sections 170, 172 respectively latch the real and imaginary parts of the reference light signal therein.

The latch sections 160, 170 for latching the real part data components of the diffraction image and reference light have outputs connected to a multiplier 174. The remaining latch sections, that is, the latch sections 166, 172 for latching the imaginary part data components of the diffraction image and reference light have outputs connected to another multiplier 176. Outputs of the multipliers 174, 176 are connected to an adder 178. The adder 178 is coupled at its output to a first input of a multiplier 180. The multiplier 180 has a second input connected to a ROM 182 for storing coefficients. An output of the multiplier 180 is connected to a first input of an adder 184. The adder 184 has a second input connected to a ROM 186 for storing bias constants and an output coupled to a data bus 188a. The ROMs 182, 186 are associated with a coefficient setting unit 190 which specifies one of the values of coefficients stored in the ROMs in response to a selection signal Ss from the master controller 162.

The interference fringe creating operation of the interface pattern processor 160a is effected as follows. When interpolated diffraction image data is input, the real part thereof is added to the real part of reference light data created by the reference light wave generator for each sampling point and the square of the resulting absolute value is computed by the multiplier 174. Likewise, the imaginary part of the input diffraction image data is added to the imaginary part of the reference light data for each sampling point and the square of the resulting absolute value is computed by the multiplier 176. The results of multiplication by the multipliers 174, 176 are added together by the adder 178, thus creating a fringe-form interference pattern of the hologram.

The amplitude of the fringe-form interference pattern may also be deflected into a negative range. In order to adjust the amplitude value of the fringe-form interference pattern, an output of the adder 178 is supplied to the multiplier 180 which in turn multiplies a coefficient supplied from the ROM 182 by the fringe-form interference pattern. An output of the multiplier 180 is further added to a bias constant supplied from the ROM 186 in the adder 184, thereby forcing the fringe-form interference pattern to have only a positive amplitude value. The positive amplitude adjusting process is based on the fact that it is difficult in principle to deal with negative values in the process of recording the hologram on the recording medium 44. By the above processing, a fringe-form interference pattern of one scanning line can be computed. By repetitively effecting the same processing for each scanning line (of the fringe-form interference pattern), a hologram fringe-form interference pattern of the object 20 can be obtained.

As shown in FIG. 9, the reference light wave generator 168 includes an MPU 192 associated with a system bus 193. Two input/output ports or IOPs 194, 196 are connected to the system bus 193 together with a control IOP 198, RAM 200 and PROM 202 so as to be mutually communicated therewith. The PROM 202 stores an processing algorithm software program for the MPU 192 in a modifiable form. A control IOP 198 plays a role of signal transfer for fetching various control signals from the master controller 162. The IOP 194 supplies reference light real part data to the latch 170 of FIG. 8. The IOP 196 supplies reference light imaginary part data to the latch 172 of FIG. 8. The MPU 192 effects optimum reference light wavefront computation for a currently desired type of hologram based on various hologram parameters (such as wavelength, direction, incident angle, reference light source position, light intensity) set by the control IOP 198. The result of computation of the interference pattern generator 30 is the amplitude and phase distributions of wave disturbance which is obtained by representing the interference pattern of the hologram by the distribution of light intensity and which is supplied to the gradient corrector 32 of FIG. 1 via the data buses 188a, 188b, 188c.

The gradient corrector 32 has a function of correcting the gradation of the modulation characteristic of the recording light source and the exposure characteristic of the recording material of the recording medium and suppresses occurrence of noise caused by distortion of the gradation characteristic of a finally created interference fringe pattern. The density characteristic mainly controls the tone characteristics of hologram. In the existing optical interference method, the gradation characteristic depends on the characteristic of the recording material and its control remains difficult. Employing the gradient corrector 32 may offer excellent controllability and desirable amplitude-transmissivity, which enhances the image quality of the hologram.

As shown in FIG. 10, the gradient corrector 32 includes three ROMs 204, 206, 208 for the 3-channel pipeline construction. The ROMs are operated under the control of a selection controller 210. Input interference image data has a gradient represented by a preset number of bits (for example, 8 bits) at each recording picture element (cell). The ROMs 204-208 have gradient correction tables. Interference image data is subjected to the gradient correction according to the gradient correction tables and corrected interference image data is output. The output data is supplied to the multi-beam scan printer 40 of the image recording section 16 of FIG. 1 via data buses 209a, 209b, 209c. The gradient correction characteristic can be freely selected by the control operation of a selection controller 210; therefore even if the recording material and/or desired gradient is changed, the requirement of the user can be easily met.

Figure 11:
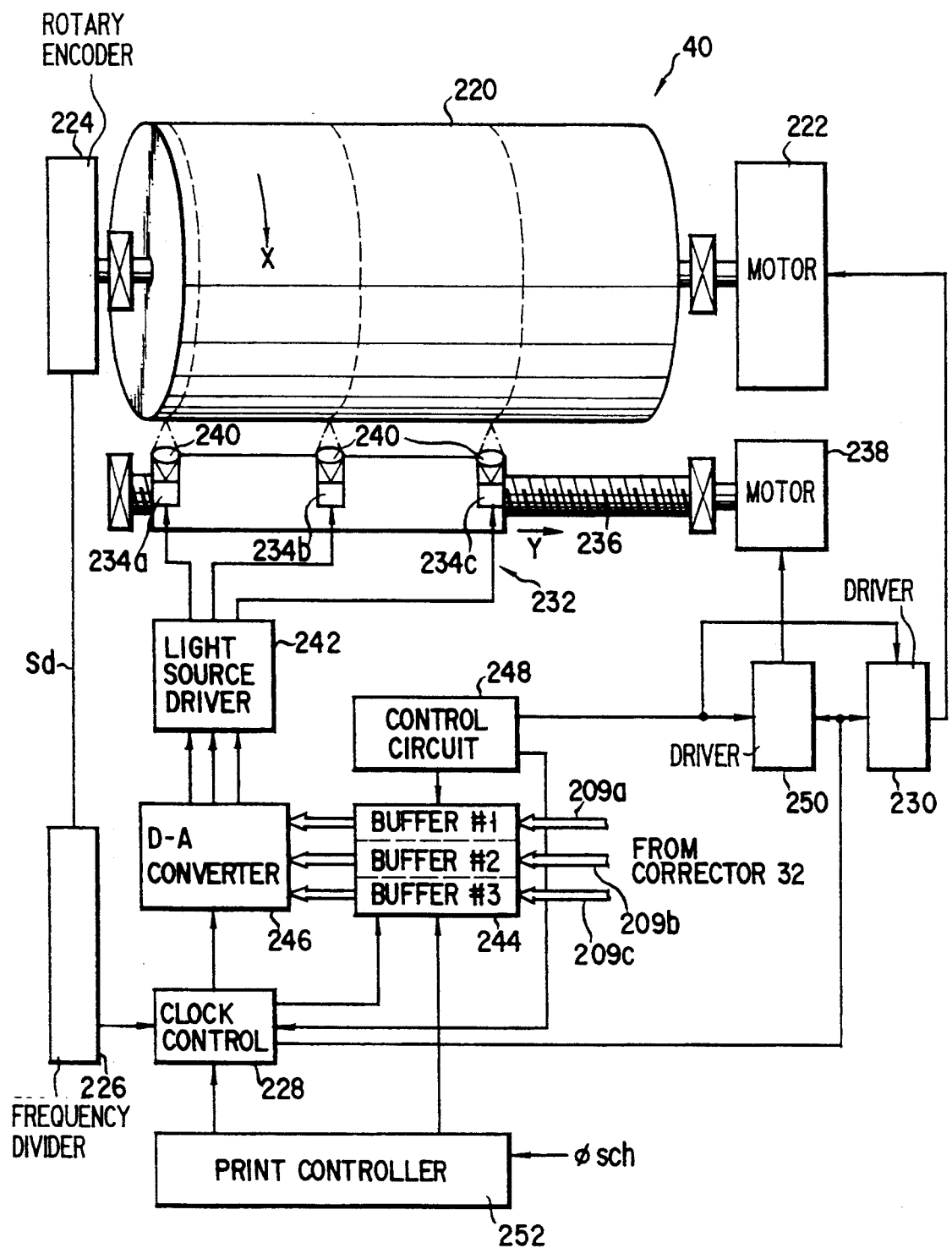
FIG. 11 is a block diagram showing the internal construction of a multi-beam scan recording section of FIG. 1.

The multi-beam scan printer 40 records a fringe-form hologram interference pattern on the medium 44 with a scanning line density which is as high as approx. 1000 to 3000 lines per millimeter. As shown in FIG. 11, the multi-beam scan printer 40 includes a rotary drum structure 220 which permits the sheet-like recording medium 44 of FIG. 1 to be set in contact with the peripheral surface thereof. The drum 220 is rotated at a constant speed by a rotary motor 222 connected to one end portion of the rotation shaft thereof. The rotation direction of the drum 220 corresponds to the main scanning direction X described before. A rotary encoder 224 is coupled to the opposite end portion of the rotation shaft of the drum 220. The encoder 224 monitors the rotating condition to generate a rotation detecting clock signal Sd. The signal Sd is transferred to a frequency dividing circuit 226. A clock controller 228 is provided which feedback-controls a driving circuit 230 for driving the motor 222 in response to the output of the frequency divider 226.

The scan printer 40 contains a movable recording head section 232 which has three recording light sources 234a, 234b, 234c arranged at a regular interval. The recording head 232 is mechanically coupled to a threaded rotation rod 236. The rod 236 is rotated by a rotary motor 238 so as to move the recording head 232 in the right and left directions along the direction Y (sub-scanning direction). The recording light sources 234 are preferably light emitting elements which can stably and continuously emit light being matched in spectroscopic sensitivity with the recording medium 44; typically, they may be a semiconductor laser. The emitted light from each of the light sources 234 is converged into a beam focused on a small spot on the surface of the rotating drum by a corresponding one of lenses 240. Three curved broken lines drawn on the peripheral surface of the drum 220 indicate the loci of the three beam spots. The diameter of each beam spot is small enough to be set substantially equal to the wavelength of the laser light. The distance between the loci of the beam spots is equal to one-third of the recording width in the sub-scanning direction Y and satisfies the condition of an integer multiple of the scanning line pitch. The number of light sources 234 used is set equal to the number of divisions of the memory area of the intermediate page memory 24. When the recording head section 232 is moved by a distance equal to one-third of the total recording width of the hologram, the operation of recording one sheet of hologram by the three light sources 234 is completed.

The semiconductor laser light sources 234a, 234b, 234c are connected to a driving circuit 242 which changes the light emitting intensities of the light sources according to an amplitude variation in the fringe-form interference pattern. The light source driver 242 has three-channel inputs to which interference pattern data items transferred via the data buses 209a, 209b, 209c are supplied via a buffer circuit 244 having three parallel buffers and a three-channel digital-to-analog converter circuit 246. A control circuit 248 is connected to the buffer circuit 244, drum motor driver 230 and driving circuit 250 for driving the head moving motor 238. A print control circuit 252 is connected to the clock controller 228 and buffer 244. The print control circuit 252 receives a synchronizing clock signal $\phi$sch to effect the total management control for the multi-beam scanning hologram recording operation in such a manner as to transfer interference pattern data items in the buffer, rotate the drum 220 and successfully synchronize the operations of the recording light sources 234 with each other.

A hologram recorded by the scan printer 40 is subjected to the post-processing such as the development and fixation in the processing section 42 of FIG. 1 to create a holographic image on the recording medium 44. The hologram development processing section 42 has a different construction depending on the recording material used for the recording medium 44, but the recording material processing section for effecting the process such as the development and fixation may be sometimes omitted from the construction of the hologram recording apparatus. For example, in a case where an electro-optical material such as a photochromic material utilizing photochemical reaction or $LiNbO_3$ whose refraction index varies by application of light, or amorphous semiconductor material or liquid-crystal material with variable photographic density and refraction index is used, the development processing section 42 becomes unnecessary. As a recording material which can be processed by a relatively simple dry process, thermoplastic processed by the electrostatic recording and heat developing process, photopolymer (which is a macromolecule matrix type polymer containing sensitized coloring matter and created by polymerizing monomers by use of polymerizing initiator) which is processed by application of ultraviolet rays and heat or the like may be used. A silver-salt photosensitive material, gelatin dichromate, photoresist which have been often used in the prior art may be used; such materials necessitate the wet process, but there will be no particular problem if the difficulty of systematically incorporating them into the apparatus 10 can be solved. Note here that the recorded hologram may be any one of the amplitude-type hologram and the phase-type one, and that this invention may be applied to either a hologram using bleaching process for silver-salt photosensitive material, or a hologram using direct record of hologram onto a phase-variable type medium such as photopolymer.

A significant feature of the computer hologram recording apparatus 10 is as follows: the interpolating process is effected for the diffraction image pattern before a fringe-form interference pattern is derived from the diffraction image pattern created based on sampled input image data and having a relatively coarse sampling density. As a result, a diffraction image pattern having picture elements interpolated therein to have an increased sampling density as shown in FIG. 6 is created. Addition of the interpolating process makes it possible to enhance the computation efficiency of the diffraction image pattern creating process, which requires highly complicated processes to be repetitively effected and consequently requires a large-scale system construction (such as an internal memory of large capacity, high-performance computer, etc.). Enhancement of the computation efficiency can be attained without lowering the image quality of the hologram. This is because an increase in the sampling density by the interpolating process leads to a high resolution of the hologram interference pattern. In practice, in the embodiment described above, a fringe-form hologram interference pattern whose resolution is finally increased to approx. 1,000 to 2,000 dots per millimeter can be derived from sampled input image data Sob having a coarse sampling density of approx. 10 dots per millimeter. This ensures that a hologram of high quality can be produced while the system construction of the computer hologram recording apparatus 10 can be made simple and therefore this will prove a great boon to the hologram manufacturers.

Attention should be directed to the fact that it is not always necessary to use, as the intermediate memory 24, the one-page memory device having a storage capacity corresponding to one page. When what is called "virtual memory" architecture is employed, the intermediate page memory 24 may be replaced with a line-memory device of reduced capacity, which has two or more line memory sections. If a page memory is inherently provided in the image input section such as the input image acquisition section 18, or if full one-screen input image is supplied externally, a smooth shift to the next interpolation process may be achieved by computing an interference pattern corresponding to two lines and updating the resultant data in a one-by-one line manner. With such an arrangement, it is possible to attain a high-speed hologram computation while using a smaller storage capacity of intermediate memory.

Another significant feature of this embodiment is that the intermediate page memory 24 is provided between the diffraction image pattern processor 22 and the interpolating processor 28 being coupled to the interface pattern generator 30. The thus derived diffraction image pattern is stored into the intermediate page memory 24. Storage of the diffraction image pattern into the memory 24 permits a sequence of hologram processes from the process by the interference pattern generator 30 to the hologram recording operation by the scan printer 40 to adopt the automated pipeline structure. In other words, usage of the intermediate page memory 24 enhances the degree of matching between the operation efficiency of the diffraction pattern computation and the operation efficiency of a sequence of hologram processes set in a pipeline form at the succeeding stage. Therefore, the operation speed of the hologram recording operation can be further enhanced.

A further significant feature of this embodiment is that the computing section 56 of the diffraction image pattern processor 22 and the reference light wave generator 168 of the interference pattern generator 30 are constructed to adequately cope with various types of hologram recording operations required by the users by utilizing the general-purpose micro-processing units 64, 192 (see FIGS. 3 and 9). The condition of modification and/or computation of the processing algorithm can be relatively easily attained by modifying the contents stored in the PROMs 76, 202. This brings forth an expanded applicability that the hardware of one computer hologram recording apparatus 10 may be used to create all of various types of holograms.

Figure 12:
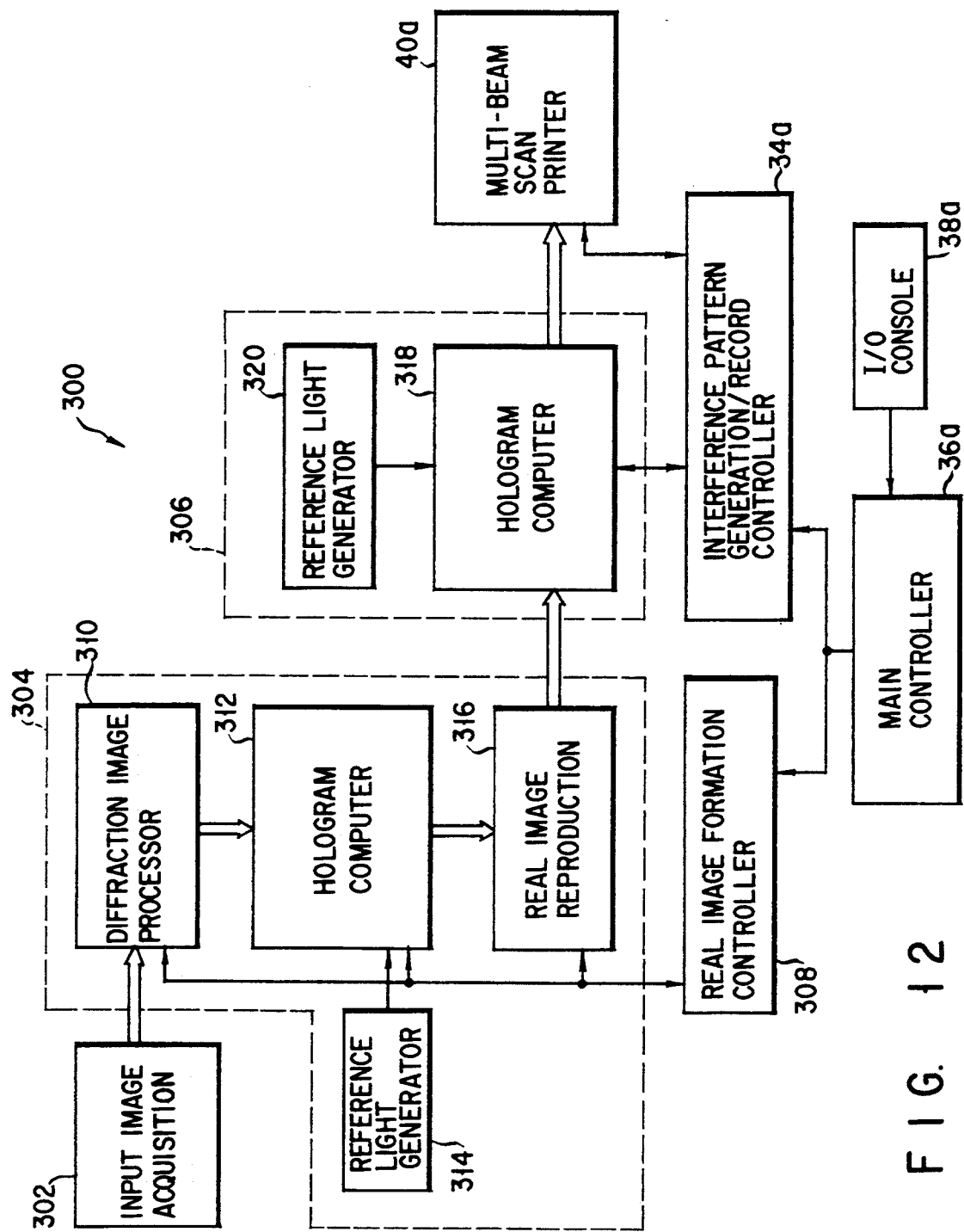
FIG. 12 is a block diagram schematically showing the whole construction of a computer hologram recording apparatus in accordance with another embodiment of this invention.

Turning now to FIG. 12, a computer hologram recording apparatus according to the second embodiment of this invention is generally designated by a numeral 300. The hologram recording apparatus 300 includes an input image acquisition section 302 for optically or electronically fetching a 3-D object (such as the object 20 of FIG. 1) which is recorded in the form of hologram, a real image computing section 304, an interference pattern computing section 306 and a multi-beam scan printer 40a which is similar to the construction shown in FIG. 11. The real image computing section 304 is controlled by a real image formation controller 308. The interference pattern computing section 306 is connected to an interference pattern generation/record controller 34a. The controllers 308, 34a are connected to a main controller 36a being associated with a console unit 38a.

Principally, in the white-light reproduction hologram technology, the computation of real image may be accomplished by the following three methods: (1) a scheme based on a diffraction pattern of a 3-D object, (2) a scheme based on an interference pattern between the a diffraction image pattern of the 3-D object and a reference light, and (3) a scheme based on the interference pattern between the real-image reproducing portion of the diffraction image pattern of the 3-D object and the reference light. The third scheme #3 may be considered as a modification of the scheme #2, and is preferably employed for computer-generated holograms. In the case of scheme #2, a real image is computed based on a resultant interference pattern to generate another interference pattern between the real image and a reference light. This interference pattern is finally recorded on a selected recording medium. The aforementioned concept of this invention can be applied to any one of the three different hologram techniques. In the first case #1, the interpolation process is performed with respect to the real image data before the computation of an interference pattern. In the cases #2 and #3, the interpolation process is carried out twice before the computation of an interference pattern for generation of the temporary (first) real image and before the interference pattern computation for formation of a finally recorded holographic pattern. The different types of white-light hologram devices that will be presented below (i.e., an image hologram, a rainbow hologram and a holographic stereogram) are basically arranged in accordance with the second scheme #2 for purposes of explanation.

The real image computing section 304 of FIG. 12 receives input image data supplied from the input image acquisition section 302 and includes a diffraction image processor 310 for computing a corresponding diffraction pattern. The diffraction image processor 310 has an output connected to a computer-assisted image processing section 312 which will be hereinafter called a "hologram computer". The hologram computer 312 is associated with a reference light generator 314. The hologram computer 312 receives data representing the wavefront of reference light and superposes the received data on the diffraction image pattern to compute a fringe-form interference pattern according to a preset algorithm. Further, the hologram computer 312 effects the interpolation process for the diffraction pattern in the same manner as previously described in the former embodiment. The result of computation by the hologram computer 312 is transferred to a real image reproducing section 316. The real image reproducing section 316 reproduces a real image of the 3-D object based on the interference pattern data input thereto. A resultant real image has a relatively coarse sampling density being equivalent to that of the diffraction image pattern before interpolation process, which leads to reduction in the total amount of computation required.

An output of the real image reproducing section 316 is connected to a hologram computer 318 contained in the interference pattern computing section 306. The hologram computer 318 is associated with a reference light generator 320. The hologram computer 318 executes an interpolation process (the second interpolation) for the reproduced read image, thereby to obtain an object image having a fine sampling density being equivalent to that of a finally-recorded interference pattern data. The hologram computer 318 causes this object image to be superposed with a reference light data derived from reference light generator 320, and computes a two-dimensional fringe-form interference pattern data under the control of the controller 34a. The computed fringe-form interference pattern data is supplied to a multi-beam can printer 40a and recorded on the recording medium as a hologram which can be reproduced by a white light in the same manner as described before.

The operation of the real image reproducing section 316 is as follows. After the diffraction image pattern of a 3-D object is computed by the diffraction image processor 310, the hologram computer 312 computes only limited data components among a hologram pattern which will be created by superposition of the diffraction pattern and the reference light. The "limited data components" are components necessary for reproducing the real image, i.e. real image components. The real image component may be mathematically represented by a complex amplitude. That is, the hologram pattern I(x,y) is defined by the following equation:

$$\begin{aligned} I(x,y) &= |O(x,y) + R(x,y)|^2 \\ &= |O(x,y)|^2 + |R(x,y)|^2 + O(x,y) \cdot R(x,y)^* + \\ & \quad O(x,y)^* \cdot R(x,y) \end{aligned}$$

where O(x,y) is a term indicating the object light on the hologram plane and R(x,y) is a term indicating the reference light. Further, "*" indicates a complex conjugate. The last or fourth term among the four terms in the above equation is the data component for reproduction of the real image. Only the real image reproducing component is extracted and subjected to the computation. Such a "selective pattern computation" feature reduces the amount of total computation tasks, thereby enhancing the computation efficiency.

According to the computer hologram recording apparatus 300, a specific pattern is computed which is equivalent to the fringe-form interference pattern data that is created by projecting a real image reproduced by the real image reproducing section 316 of the real image computing section 304 onto the hologram plane of the hologram computer 318 contained in the succeeding-stage interference pattern computing section 306 and superposing the real image on the reference light. The computed fringe-form interference pattern data is recorded on the recording medium by the scan printer 40a. Therefore, the resultant hologram becomes a holographic image which can be basically reproduced by use of a white light.

Figure 13:
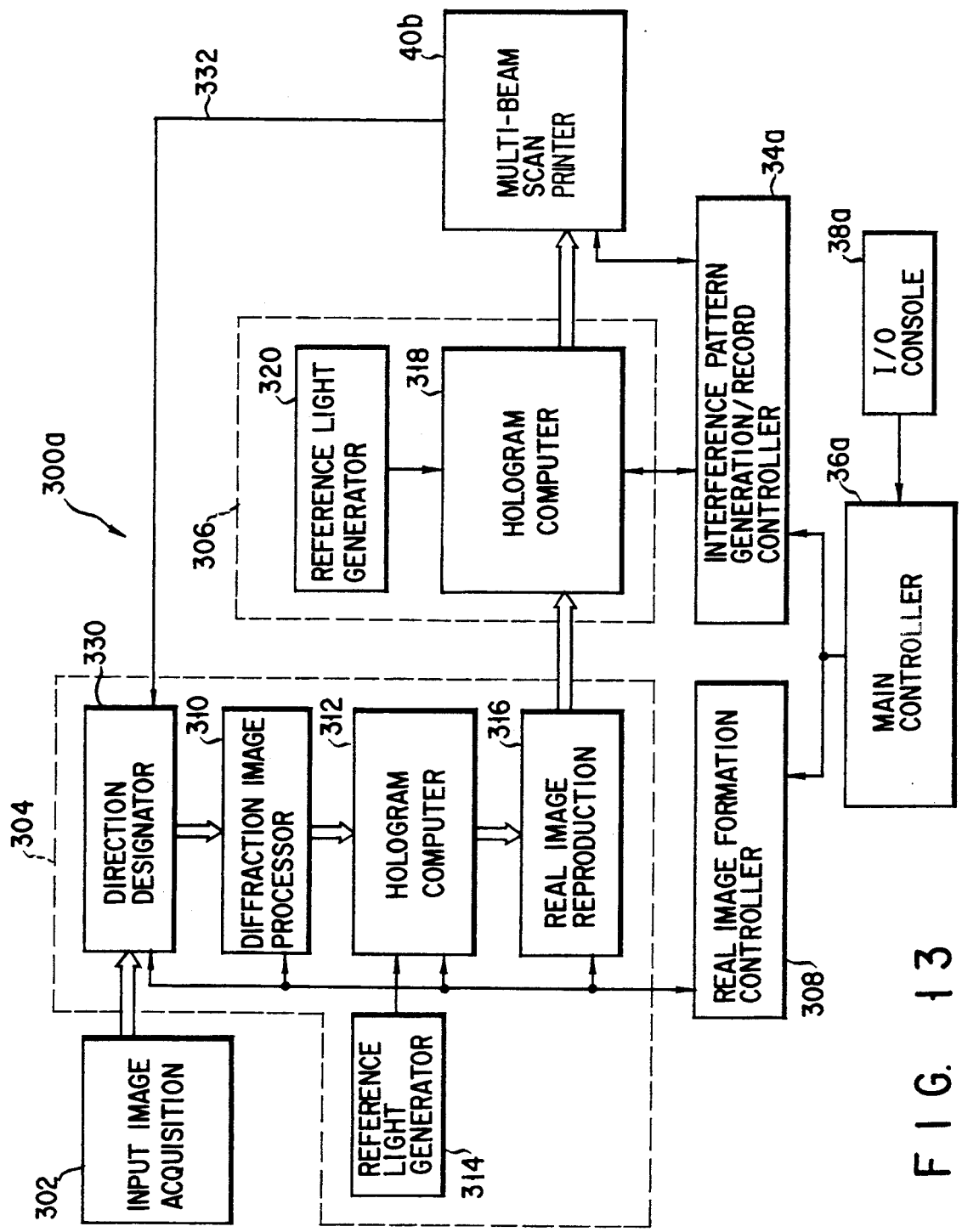
FIGS. 13 and 14 are block diagrams schematically showing the whole construction of two possible modifications of the apparatus of FIG. 12.

A computer hologram recording apparatus 300a shown in FIG. 13 is similar to that of FIG. 12 except the following point: (1) a direction designating section 330 for designating the direction of the diffraction light is additionally provided in the real image computing section 304. The direction designating section 330 is inserted in the data bus connecting the input image acquisition section 302 to the diffraction image processor 310. The direction designating section 330 is connected to a multi-beam laser scan printer 40b via a signal transmission line 332. The printer 40b supplies a signal for designating the direction of a next diffraction light to the direction designator 330. With such an arrangement, the embodiment 300a can cope with formation of "rainbow holograms". Since a real image is reproduced from interference fringes of narrow slit portions, this type of hologram has a parallax only in one direction, but the image quality is good and the degree of blur in the image can be reduced in comparison with the image hologram of the above embodiment 300.

The process effected by use of the direction designator 330 for forming rainbow holograms is as follows. In general, in order to form a rainbow hologram by use of the conventional optical technique, a hologram is first formed by an ordinary method and then a narrow slit portion is formed in the hologram. After a real image is reproduced starting from the slit portion, the reproduced real image is recorded in the form of hologram again. In this procedure, the computation efficiency is suppressed to an extremely low level. In the embodiment 300a, the computation is efficiently effected by utilizing the fact that a parallax occurs only in one direction in the finally obtained hologram.

Assume that the hologram is a two-dimensional plane object. In this case, the concrete computation method is as follows. First, one line (parallel to the slit) at which a light beam having a preset elevation angle with respect to the slit and parallel to the slit is emitted from the slit intersects the object plane is determined. Next, a diffraction image pattern caused by the one-line component of the object plane in the slit position (alternatively, an fringe-form pattern or only the real image reproducing portion) is computed. This computation is effected only for one line and thus the computation for the diffraction image pattern with a lowered resolution is attained.

Then, a real image of one line is reproduced from the slit portion of the diffraction image pattern (or interference fringe pattern or the real image reproducing portion of the interference fringe pattern). The reproduced real image of one line is subjected to the interpolation process, thereby increasing the sampling density to provide a high resolution necessary for the interference fringe pattern. After this, a reference light is superposed on the diffraction image pattern, an interference fringe pattern is computed and then the laser scanning record operation is effected. Generally, a plane wave is often used as the reference light. The number of scanning lines obtained at this time depends on the incident angle of the plane wave of the reference light. For example, when the incident angle of the plane wave is set in the vertical direction (parallel to the slit), the interference fringe pattern occurs in the vertical direction, which requires a larger number of scanning lines to be recorded. That is, an object image for one-line width has a larger number of scanning lines in the same width. On the other hand, when the incident angle of the plane wave is set in the horizontal direction (perpendicular to the slit), the one-line width can be filled with one scanning line.

The above computation process with respect to one line will be repeated for the following and remaining lines with the elevation angle at the slit position being changed sequentially, thereby to complete a rainbow hologram. The method of changing the elevation angle may be attained by changing the angle at a uniform dispersion angular interval or at a non-uniform dispersion angular interval which is changed in a large angle portion and in a small angle portion. If desired, the elevation angle may be determined without using the dispersion angle so as to make the width of one line of the object image constant. The density of dispersion may be satisfactorily set to approx. eight to ten lines per millimeter. By expanding the above computation technique, it becomes possible to deal with a hologram for a 3-D object.

Figure 14:
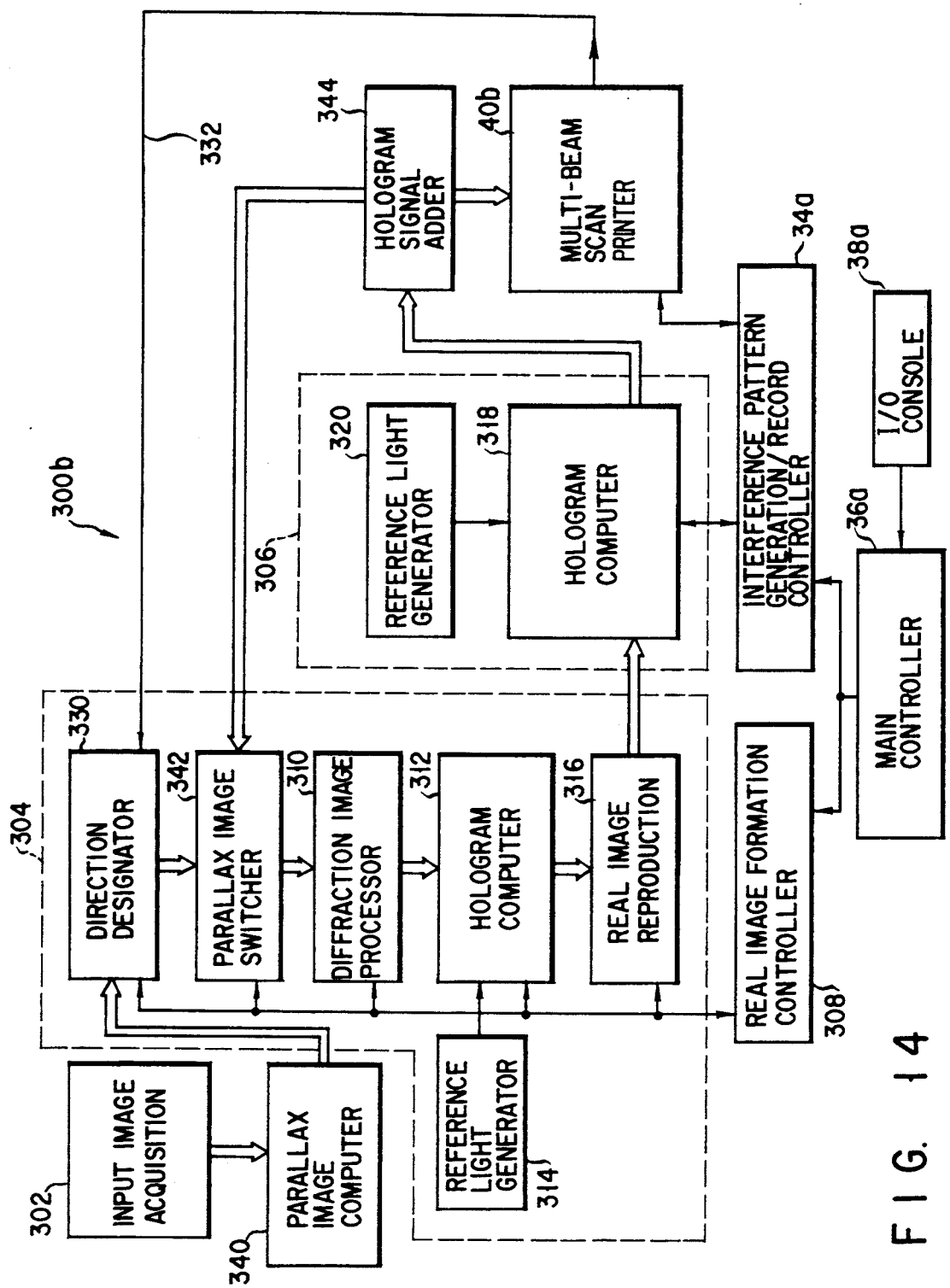

A computer hologram recording apparatus 300b shown in FIG. 14 is similar to that of FIG. 13 with (1) a parallax image computation section 340 being inserted in the data bus connecting an input image acquisition unit 302 to the direction designator 330, (2) a parallax image switching section 342 being inserted between the direction designator 330 and the diffraction image processor 310, and (3) a hologram signal adding section 344 being added between the hologram computer 318 and the multi-beam printer 40b. The computer hologram recording apparatus 300b is suitable for holographic stereogram.

The parallax image computation section 340 variously changes the angle at which a 3-D body or object is observed and computes a two-dimensional image at each angle as a parallax image prior to the main hologram computation. This process may be considered to correspond to the operation of photographing an object while viewing the same from different angles. A plurality (N) of two-dimensional parallax images are prepared with respect to several directions at the first to N-th angles. The width of a slit is divided into the corresponding number (N) of portions. These divided slit-width portions may range from 1 to 5 millimeters.

Subsequently, in a similar manner to that of the embodiment 300a, a diffraction pattern (or an interference pattern or the real image reproducing portion of the interference pattern) at the first divided-slit position is computed based on one line of the first parallax image corresponding to the direction of the elevation angle with respect to the slit position. A real image with respect to the first divided-slit position is then reproduced. The resulting reproduced real image is superposed on a reference light data generated by reference light generator 320, to thereby compute a first interference pattern. The computation method at this time is similar to that of the embodiment of FIG. 13. Thereafter, a diffraction pattern (or an interference pattern or the real image reproducing portion of the interference pattern) at the second divided-slit position is computed to reproduce a corresponding real image. By using this real image, an interference pattern between the real image and the reference light is computed in a similar manner as described above. The second interference pattern is added by adder 344 to the first interference pattern. The above computation processes will be repeatedly executed for the remaining (i.e., the third to N-th) parallax images. An interference pattern just computed in every process is added by adder 344 to the added results being presently obtained. As a result, there is obtained an interference pattern corresponding to one line of the scan-recording. This one-line interference pattern is recorded by printer 40b onto a recording medium. The above computation processes will be repeated sequentially with respect to the N parallax images with the direction of diffraction light (elevation angle) being changed by diffraction light direction designator 330. As a result, a holographic stereogram is formed which may be reproduced by white light.

The present invention is not limited to the above-described specific embodiments and may be practiced or embodied in still other ways without departing from the spirit or essential character thereof.

For example, at the time of reduction of this invention to practice, the input image storing page memory 52 of FIG. 2 for temporarily storing transferred sampling image data may not always be necessary. If the data transfer timing can be successfully set to correspond to the timing of the diffraction pattern computation operation, the input page memory 52 may be replaced by a known line memory or may be replaced by a buffer which is more simple in construction.

Further, the operation of the interpolation processing section 28 is not limited to the one-dimensional interpolation process explained with reference to FIG. 6. The simple linear interpolation and Lagrange interpolation can be utilized, but not only these methods but also the process of interpolating data can be utilized irrespective of the type thereof. Further, a case where the interpolation process is effected by use of two lines was explained, but if a larger number of lines are used, a more effective interpolation process can be attained although the construction may become somewhat complicated.

In the embodiment of FIGS. 12 to 14, a slit is not limited to one, and when a plurality of slits are used, a parallax occurs not only in the horizontal direction but also in the vertical direction so that the observation more analogous to that of a 3-D object can be attained. Further, when it is desired to form a color hologram, the hologram computation process in the embodiments 300, 300a, 300b is independently effected by use of three kinds of wavelengths of red, blue and green and three kinds of interference fringe patterns thus obtained are superposed and scan-recorded on a recording medium which can record three-color signals.

In the embodiment 300b of FIG. 14, the adding operation of adder 344 is executed after the final interference pattern with respect to every parallax image is computed individually. This may be modified as follows. A diffraction pattern (or an interference pattern or the real image reproducing portion of the interference pattern) at a corresponding divided-slit position is computed for each of the parallax images. All the divided-slit portions are then coupled together sequentially in the order of the parallax images, to reconstruct a diffraction image pattern (or an interference pattern or the real image reproducing portion of the interference pattern) of one line in all the parallax images. The real image is then reproduced. In such case, since the entire one-line parallax image information is included in a resultant data, the interference pattern computed by adding a reference light thereto may be recorded as a one-line scan-recording signal.

The embodiments described previously may be also applied to a computer-generated hologram system employing therein a 3-D display terminal device in the alternative of the hard-copy recording medium 44 without modifying the basic concept of the invention.

What is claimed is:

1. An apparatus for forming a hologram for reproduction, comprising:

first computation means for receiving an input image signal representing an object and for computing corresponding diffraction pattern data with a first sampling density;

second computation means coupled to said first computation means, for interpolating the diffraction pattern data to generate interpolated diffraction pattern data with an increased second sampling density;

third computation means coupled to said second computation means, for computing interference pattern data between the interpolated diffraction pattern data and reference wave data; and holographic image forming means coupled to said third computation means, for outputting the interference pattern data to a preselected type of output device, and for allowing reproduction of a holographic image to be formed by controlling a generation of coherent light using the interference pattern data.

2. The apparatus according to claim 1, wherein said holographic image forming means comprises printer means for recording the interference pattern data on a recording medium.

3. The apparatus according to claim 1, further comprising:
   storage means connected to the first and second computation means, for storing therein the diffraction pattern data with the diffraction pattern data being divided into a plurality of areas.

4. The apparatus according to claim 3, wherein said storage means includes a semiconductor page memory device.

5. The apparatus according to claim 4, wherein said semiconductor page memory device has a memory space which permits adjacent ones of said plurality of areas having the diffraction pattern data stored therein to be overlapped at end 10 portions thereof.

6. The apparatus according to claim 5, wherein said second computation means comprises:
   interpolation processing means having a plurality of channels, for effecting a predetermined type of interpolation process with respect to said plurality of areas in said semiconductor page memory device in a parallel manner.

7. The apparatus according to claim 6, wherein said first computation means comprises:
   programmable memory means for modifiably storing an algorithm defining a method of computing said diffraction pattern data; and
   micro-processing unit means associated with said programmable memory means, for operating according to said algorithm.

8. The apparatus according to claim 6, wherein said third computation means comprises:
   reference light wave generator means for generating reference light data representing a wavefront of a selected type of reference light; and
   means connected to said second computation means, for computing a fringe-shaped interference pattern data between the interpolated diffraction pattern data and the reference light data.

9. The apparatus according to claim 8, wherein said reference light wave generator means comprises:
   programmable memory means for modifiably storing an algorithm defining a method of computing said interference pattern data; and
   micro-processing unit means associated with said programmable memory means, for operating according to said algorithm.

10. A method for forming a hologram for reproduction, comprising the steps of:
    receiving an input image signal indicative of an object;
    computing diffraction pattern data which corresponds to the input image signal with a first sampling density;
    interpolating the diffraction pattern data to generate interpolated diffraction pattern data with an increased second sampling density;
    computing interference pattern data between the interpolated diffraction pattern and reference wave data; and
    forming a holographic image by outputting the interference pattern data to a preselected type of output device, and allowing reproduction of a holographic image by controlling a generation of coherent light using the interference pattern data.

11. The method according to claim 10, wherein the step of forming a holographic image records the interference pattern data on a recording medium by use of light beams emitted from a plurality of recording light emitting sections.

12. The method according to claim 11, wherein the diffraction pattern data is temporarily stored in a page memory section which is divided into a plurality of areas.

13. The method according to claim 12, wherein adjacent ones of said plurality of areas of the stored diffraction pattern data are overlapped at the end portions thereof.

14. The method according to claim 13, wherein the interpolating process is carried out for said plurality of areas in a parallel manner.

15. The method according to claim 14, wherein the steps of computing the interference pattern data and recording the interference pattern data are sequentially carried out in a pipeline-processing manner.

16. A hologram printing system for recording a hologram on a photographic recording medium which produces a reproduced three-dimensional image in space upon illumination of white light, said system comprising:
    image acquisition means for receiving an object light of a three-dimensional object and for generating a corresponding image information signal;
    first computation means connected to said image acquisition means, for computing interference image pattern data between the object light and a first coherent reference light of predetermined type;
    real image reproduction means connected to said first computation means, for reproducing a real image of the object by use of the computed interference image pattern data;
    second computation means for computing fringe-form interference pattern data between the reproduced real image and a second coherent reference light of predetermined type; and
    printer means connected to said second computation means, for recording the fringe-form interference pattern data on said recording medium.

17. The system according to claim 16, wherein said first computation means comprises:
    means connected to said image acquisition means, for computing diffraction image pattern data with a first sampling density in response to the image information signal;
    means for interpolating the diffraction image pattern data to produce interpolated diffraction image pattern data with an increased second sampling density; and
    means for computing pattern data and the first reference light as said interference image pattern data.

18. The system according to claim 17, wherein said first computation means includes:
    page memory means for temporarily storing the diffraction image pattern data having the first sampling density so that the diffraction image pattern data is divided into a plurality of areas.

19. The system according to claim 16, wherein said printer means includes:

a multi-beam scan printer having a plurality of laser oscillators for emitting recording light beams.

20. The system according to claim 19, wherein said multi-beam scan printer includes:
driver means for driving said laser oscillators to cause the recording light beams to vary in intensity according to the fringe-form interference pattern data; and
beam-scan control means for permitting the recording light beams to move on said recording medium in a first direction while causing said laser oscillators to move on said recording medium in a second direction transverse to the first direction.

21. An apparatus for forming a hologram for later reproduction using white light, comprising:
first computation means for computing real image data indicative of an object to generate computed real image data;
second computation means for suing the real image data as object light data, and for computing interference pattern data between the object light data and reference light data to generate computed interference pattern data; and
scan-recorder means for receiving the interference pattern data, and for recording said interference pattern data on a recording medium.

22. The apparatus according to claim 21, wherein said first computation means comprises:
first sub-computation means for receiving an input image signal indicative of the object, and for computing corresponding diffraction pattern data with a first sampling density;
second sub-computation means coupled to said first sub-computation means, for performing an interpolation for the diffraction pattern data, and for generating interpolated diffraction pattern data having a second sampling density being greater than the first sampling density; and
third sub-computation means coupled to said second sub-computation means, for computing interference pattern data between said interpolated diffraction pattern data and reference light data.

23. The apparatus according to claim 22, wherein said second sub-computation means comprises:
fourth sub-computation means for interpolating said computed real image data to generate an interpolated real image data having an increased sampling density; and
fifth sub-computation means coupled to said fourth sub-computation means, for computing interference pattern data between the interpolated real image data and reference light data.

24. The apparatus according to claim 21, wherein said first computation means computes the real image data using one of the group consisting of a diffraction pattern data, an interference pattern data between a diffraction pattern and a reference light, and a real-image reproducing portion of the interference pattern data between the diffraction pattern and the reference light.

25. The apparatus according to claim 22, wherein said first computation means computes the real image data using one of the group consisting of a diffraction pattern data, an interference pattern data between a diffraction pattern and a reference light, and a real-image reproducing portion of the interference pattern data between the diffraction pattern and the reference light.

26. The apparatus according to claim 21, wherein said first computation means includes:
one-line processing means for receiving an input image signal indicative of the object, for applying a parallax restriction to the input image signal, and for computing a pattern generated at a predetermined slit position of a one line component of an object plane.

27. The apparatus according to claim 26, wherein said one-line processing means computes the real image data using one of the group consisting of diffraction pattern data, interference pattern data between a diffraction pattern and a reference light, and a real-image reproducing portion of the interference pattern data between the diffraction pattern and the reference light.

28. The apparatus according to claim 2, wherein said printer means includes a multi-beam scan printer having a plurality of light emitting elements for emitting recording light beams.

29. An apparatus for forming a holographic image, comprising:
first computation means for receiving an input image signal representing an object and for computing corresponding diffraction pattern data with a first sampling density;
second computation means coupled to said first computation means, for interpolating the diffraction pattern data to generate interpolated diffraction pattern data with an increased second sampling density;
third computation means coupled to said second computation means, for computing interference pattern data between the interpolated diffraction pattern data and reference wave data; and
holographic image forming means coupled to said third computation means, for forming a holographic image by controlling a generation of coherent light using the interference pattern data.

30. The apparatus according to claim 29, wherein said holographic image forming means comprises printer means for recording the interference pattern data on a recording medium.

31. A method for forming a holographic image, comprising the steps of:
receiving an input image signal indicative of an object;
computing diffraction pattern data which corresponds to the input image signal with a first sampling density;
interpolating the diffraction pattern data to generate interpolated diffraction pattern data with an increased second sampling density;
computing interference pattern data between the interpolated diffraction pattern and reference wave data; and
forming a holographic image by controlling a generation of coherent light using the interference pattern data.

32. The method according to claim 31, wherein the step of forming a holographic image records the interference pattern data on a recording medium using the coherent light.

* * * * *